United States Patent [19]
Otsuki et al.

[11] Patent Number: 5,929,932
[45] Date of Patent: Jul. 27, 1999

[54] PROGRAM GUIDE DISPLAY CONTROLLER AT USER TERMINAL OF TELEVISION BROADCASTING SYSTEM

[75] Inventors: Masako Otsuki, Osaka; Takahiro Kondo; Yoshinori Hama, both of Daito; Hiroshi Tsunoda, Kadoma; Nobuhiro Hara, Hirakata, all of Japan

[73] Assignee: Sanyo Electric Co., Ltd., Japan

[21] Appl. No.: 08/733,805

[22] Filed: Oct. 18, 1996

[30] Foreign Application Priority Data

Oct. 24, 1995 [JP] Japan .................................. 7-275646
Aug. 23, 1996 [JP] Japan .................................. 8-222639

[51] Int. Cl.⁶ ..................................................... H04N 5/445
[52] U.S. Cl. ........................... 348/569; 348/906; 348/564
[58] Field of Search ..................................... 348/569, 906, 348/563, 564; 345/327; H04N 5/445, 5/50

[56] References Cited

U.S. PATENT DOCUMENTS 5,596,373  1/1997  White ....................................... 348/569
5,694,176  12/1997  Bruette ................................... 348/563
5,737,030  4/1998  Hong ...................................... 348/564

FOREIGN PATENT DOCUMENTS 0 682 452  11/1995  European Pat. Off. .

*Primary Examiner*—Sherrie Hsia
*Attorney, Agent, or Firm*—Michaelson & Wallace; Peter L. Michaelson; John C. Pokotylo

[57] ABSTRACT

A program guide display controller at a user terminal of a television broadcasting system in which a user can enter a program guide display command for displaying a program guide on a display device, and the user can set contents for restricting the program guide displayed on the display device. A memory is provided for storing the restricting contents set by the user. A display control is provided for displaying a program guide adapted to the restricting contents stored in the memory on the display device when the program guide display command is entered by the user.

5 Claims, 19 Drawing Sheets

FIG. 7

ALL

Movies
Sports
Specials
Series
News
Shopping

| | 7:00 | | 8:00 | | 9:00 |
|---|---|---|---|---|---|
| Ch.1 | A | | B | | C |
| Ch.2 | D | E | | F | G |
| Ch.3 | H | | I | | J |

| | 9:00 | | 10:00 | | 11:00 |
|---|---|---|---|---|---|
| Ch.1 | | Q | | R | |
| Ch.2 | S | | T | | U |
| Ch.3 | | V | | W | |

FIG. 11

| | 7:00 | 8:00 | | 7:00 | 8:00 |
|---|---|---|---|---|---|
| Ch.1 | A | B | Ch.7 | X | |
| Ch.2 | D | E | Ch.8 | Y | Z |
| Ch.3 | H | I | Ch.9 | AA | |
| Ch.4 | K | | Ch.10 | BB | |
| Ch.5 | M | | Ch.11 | CC | |
| Ch.6 | P | | Ch.12 | DD | EE |

FIG. 22

LIST OF PROGRAMS

| A ··· | PM 2:00~ |
| A ··· | AM 9:00~ |
| A ··· | PM 5:00~ |
| A ··· | PM 6:30~ |
| A ··· | AM 2:00~ |
| A ··· | PM 1:00~ |

TITLE OF PROGRAM    SELECT FIRST LETTER

| A | B | C | D | E | F | G |
|---|---|---|---|---|---|---|
| H | I | J | K | L | M | N |
| O | P | Q | R | S | T | U |
| V | W | X | Y | Z |   |   |

PROGRAM GUIDE DISPLAY CONTROLLER AT USER TERMINAL OF TELEVISION BROADCASTING SYSTEM

BACKGROUND OF THE INVENTION

1. Field of the Invention

The present invention relates to a program guide display controller at a user terminal of a television broadcasting system.

2. Description of the Prior Art

In the DSS (Digital Satellite Broadcasting System) used in the United States, many (150 or more) channels are prepared, and many programs are presented. In the system, guide information of programs being currently broadcast and programs to be broadcast in the future, together with image data, are transmitted at predetermined time intervals. The user terminal has a function of displaying a program guide screen (a program guide list) on the basis of the program guide information.

A program guide list e which is a part of the whole of a program guide list E corresponding to all program guide information received are displayed as a program guide screen, as shown in FIG. 1, at the user terminal. A plurality of program guides are displayed in a matrix shape using the vertical axis as a channel number axis and using the horizontal axis as a time axis on the program guide screen. In this example, programs corresponding to five channels and corresponding to two and a half hours are displayed on the program guide screen. The numbers of channels are displayed in longitudinal alignment in the left end of the program guide screen. In a row corresponding to each of the channels, frames indicating periods of time of the respective programs broadcast on the channel are displayed, and the titles (A to P) of the programs are respectively displayed in the frames.

A cursor for designating a program and scrolling the program guide screen is displayed on the program guide screen. The cursor is moved by operating four cursor moving keys respectively provided in left, right, up and down directions. The cursor is moved by one channel every time the cursor moving key for upward movement or downward movement is operated. On the other hand, the cursor is moved by one predetermined time period every time the cursor moving key for leftward movement or rightward movement is operated.

Since the number of programs to be selected by a user on the basis of the program guide screen is very large, an operation for selecting a program becomes complicated.

SUMMARY OF THE INVENTION

An object of the present invention is to provide a program guide display controller at a user terminal of a television broadcasting system which makes it easy to select a program suiting the taste of a user.

Another object of the present invention is to provide a program guide display controller at a user terminal of a television broadcasting system which can display only programs being currently broadcasted (programs being currently presented by broadcasting stations) on a program guide screen.

Still another object of the present invention is to provide a program guide display controller at a user terminal of a television broadcasting system which can restrict a program guide displayed on a program guide screen depending on the taste of a user.

Still another object of the present invention is to provide a program guide display controller at a user terminal of a television broadcasting system which can restrict a program guide displayed on a program guide screen depending on the taste of a user and can hold its restricting contents.

A further object of the present invention is to provide a program guide display controller at a user terminal of a television broadcasting system which can perform not only one type of setting but also a plurality of types of setting for restricting a program guide displayed on a program guide screen.

A still further object of the present invention is to provide a program guide display controller at a user terminal of a television broadcasting system which can simultaneously display a menu screen for restricting a program guide displayed on a program guide screen, for example, and the program guide screen.

A still further object of the present invention is to provide a program guide display controller at a user terminal of a television broadcasting system which can simultaneously display a menu screen for restricting a program guide displayed on a program guide screen, for example, and the program guide screen, and can display the screen which is active and the screen which is not active so that they can be visually identified.

A first program guide display controller at a user terminal of a television broadcasting system according to the present invention is characterized by comprising entry means for enabling a user to enter a program guide display command for displaying a program guide on a display device, setting means for enabling the user to set contents for restricting the program guide displayed on the display device, storage means for storing the restricting contents set by the setting means, and display control means for displaying a program guide adapted to the restricting contents stored in the storage means on the display device when the program guide display command is entered by the entry means.

Examples of the setting means include one capable of restricting a program displayed as the program guide with respect to each of time, a channel and a category. Further, the restricting contents stored in the storage means are updated every time they are set by the setting means.

A second program guide display controller at a user terminal of a television broadcasting system according to the present invention is characterized by comprising entry means for enabling a user to enter a program guide display command for displaying a program guide on a display device, setting means for enabling the user to set contents for restricting the program guide displayed on the display device, storage means for respectively storing a plurality of types of different restricting contents set by the setting means in separate storage areas, selecting means for enabling the user to select one type of restricting contents out of the plurality of types of restricting contents stored in the storage means and making the restricting contents effective, and display control means for displaying a program guide adapted to the restricting contents selected by the user out of the plurality of types of restricting contents stored in the storage means and made effective when the program guide display command is entered.

Examples of the setting means include one capable of restricting a program displayed as the program guide with respect to each of time, a channel and a category.

Examples of the setting means include one for restricting a program displayed as the program guide to a program being currently broadcasted.

It is preferable to provide means for moving, when a program displayed as the program guide is restricted to the program being currently broadcasted by the setting means, and the program guide corresponding to only the program being currently broadcasted is displayed by the display control means, a cursor onto the program guide displayed by the display control means, and means for displaying an image of a program corresponding to the program guide on which the cursor is positioned in an area other than a program guide screen.

A third program guide display controller at a user terminal of a television broadcasting system according to the present invention is characterized by comprising first entry means for enabling a user to enter a program guide display command for displaying a program guide on a display device, second entry means for enabling the user to enter a menu screen display command for displaying a menu screen for making the user set contents for restricting the program guide displayed on the display, means for simultaneously displaying both the program guide screen and the menu screen when the program guide display command or the menu screen display command are entered as well as making active only one of the screens which corresponds to the entered command, storage means for storing the set restricting contents on the menu screen, and program contents display control means for setting displayed contents on the program guide screen to contents adapted to the restricting contents stored in the storage means.

A fourth program guide display controller at a user terminal of a television broadcasting system according to the present invention is characterized by comprising entry means for entering a first command for displaying a menu screen for performing various types of setting and a second command for displaying a program guide screen, and means for simultaneously displaying both the menu screen and the program guide screen when the first command or the second command is entered as well as making active only one of the screens which corresponds to the entered command.

A fifth program guide display controller at a user terminal of a television broadcasting system according to the present invention is characterized by comprising entry means for entering a first command for displaying a menu screen for performing various types of setting and a second command for displaying a program guide screen, first display control means for simultaneously displaying both the menu screen and the program guide screen when the first command or the second command is entered as well as making active only one of the screens which corresponds to the entered command, and second display control means for displaying the screen which is active and the screen which is not active out of the menu screen and the program guide screen so that they can be visually identified.

Examples of the second display control means include one for displaying the screen which is active by opacity and displaying the screen which is not active by halftones. More specifically, examples of the second display control means include one comprising means for separately preparing color pallets used for the menu screen and color pallets used for the program guide screen, setting the transmittance of each of the color pallets for the menu screen to a value corresponding to the opacity as well as setting the transmittance of each of the color pallets for the program guide screen to a value corresponding to the halftones, and setting the transmittance of each of the color pallets for the program guide screen to a value corresponding to the opacity when the program guide screen is active as well as setting the transmittance of each of the color pallets for the menu screen to a value corresponding to the halftones.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 7 is a typical view showing a sub-menu displayed when a button 15 is designated by a cursor;

FIG. 10 is a typical view showing another example of a program guide screen having a different layout;

FIG. 11 is a typical view showing still another example of a program guide screen having a different layout;

FIG. 22 is a typical view showing one example of a list display screen;

FIG. 23 is a typical view showing one example of a first letter selection screen for designating the first letters of the titles of programs;

DETAILED DESCRIPTION OF THE PREFERRED EMBODIMENTS

Figure 1:
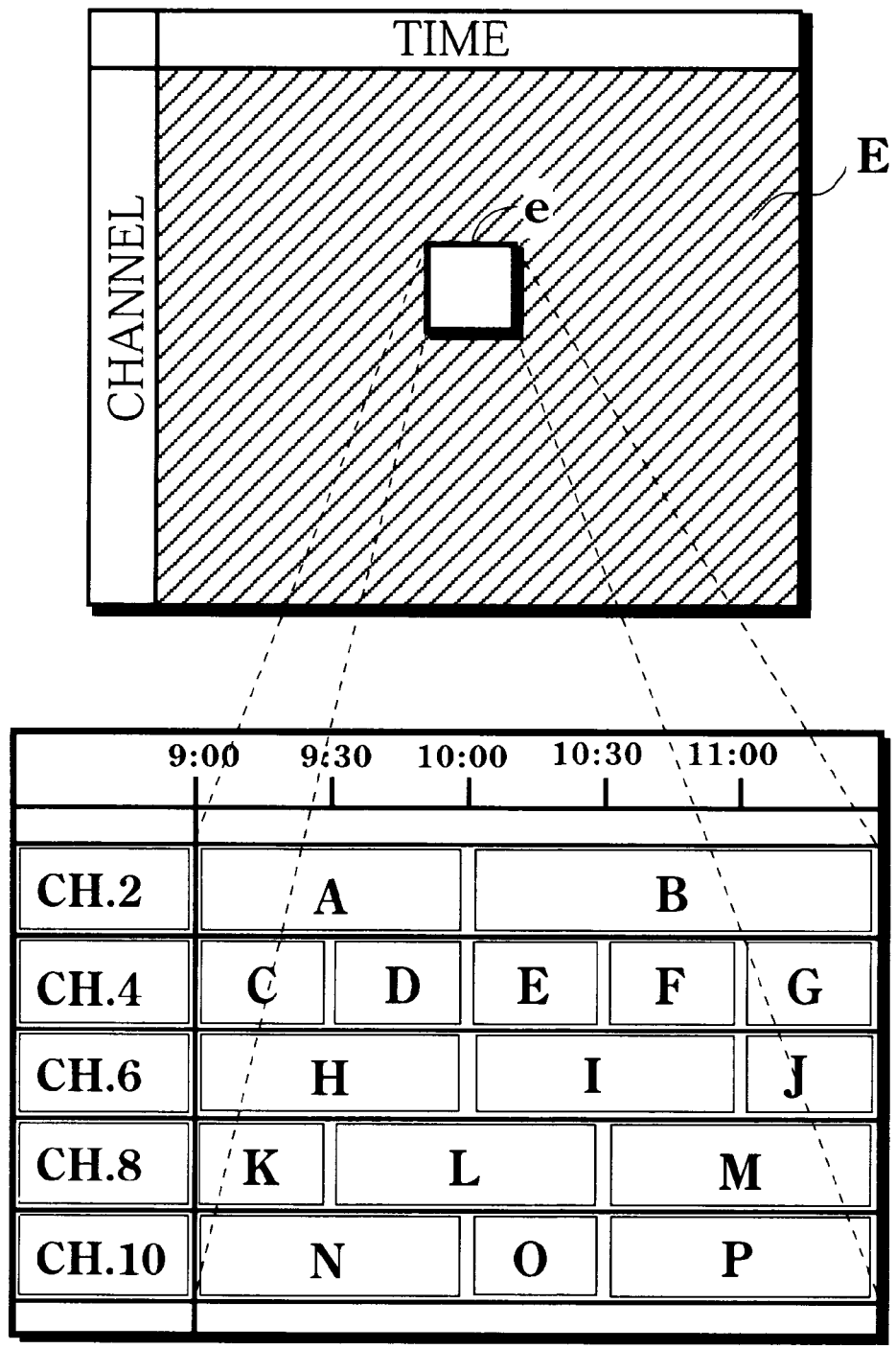
FIG. 1 is a typical view showing a program guide screen displayed at a user terminal in the DSS.

Referring now to the drawings, embodiments in a case where the present invention is applied to the DSS (Digital Satellite Broadcasting System) used in the United States are described.

[1] Description of First Embodiment

The DSS, which is digital broadcasting utilizing satellite, will be first briefly described. In the DSS, a plurality of programs, data and the like are transmitted upon being time division multiplexed on one bit stream utilizing a digital compression algorithm using an MPEG (Moving Picture Experts Group) system. The MPEG is a digital compression system standardized by ISO (International Organizations for Standardization)/IEC (International Electrotechnical Commission), and two types of standardization are currently terminated (MPEG1 and MPEG2). The details of the compression algorithms for the MPEG1 and the MPEG2 will be respectively described in ISO/IEC 11172 and 13818.

Furthermore, in the case of the DSS, a channel means transmission of one program, and does not mean one transponder of the satellite, that is, one frequency band. Specifically, in DSS broadcasting, a plurality of channels are sent by one transponder, and the respective channels have channel numbers. Consequently, broadcasting data corresponding to the plurality of channels are sent out upon being subjected to time division using one frequency band. In order to select a program, therefore, a frequency on which the program is multiplexed is first selected, after which a desired program is selected from an obtained bit stream.

Figure 2:
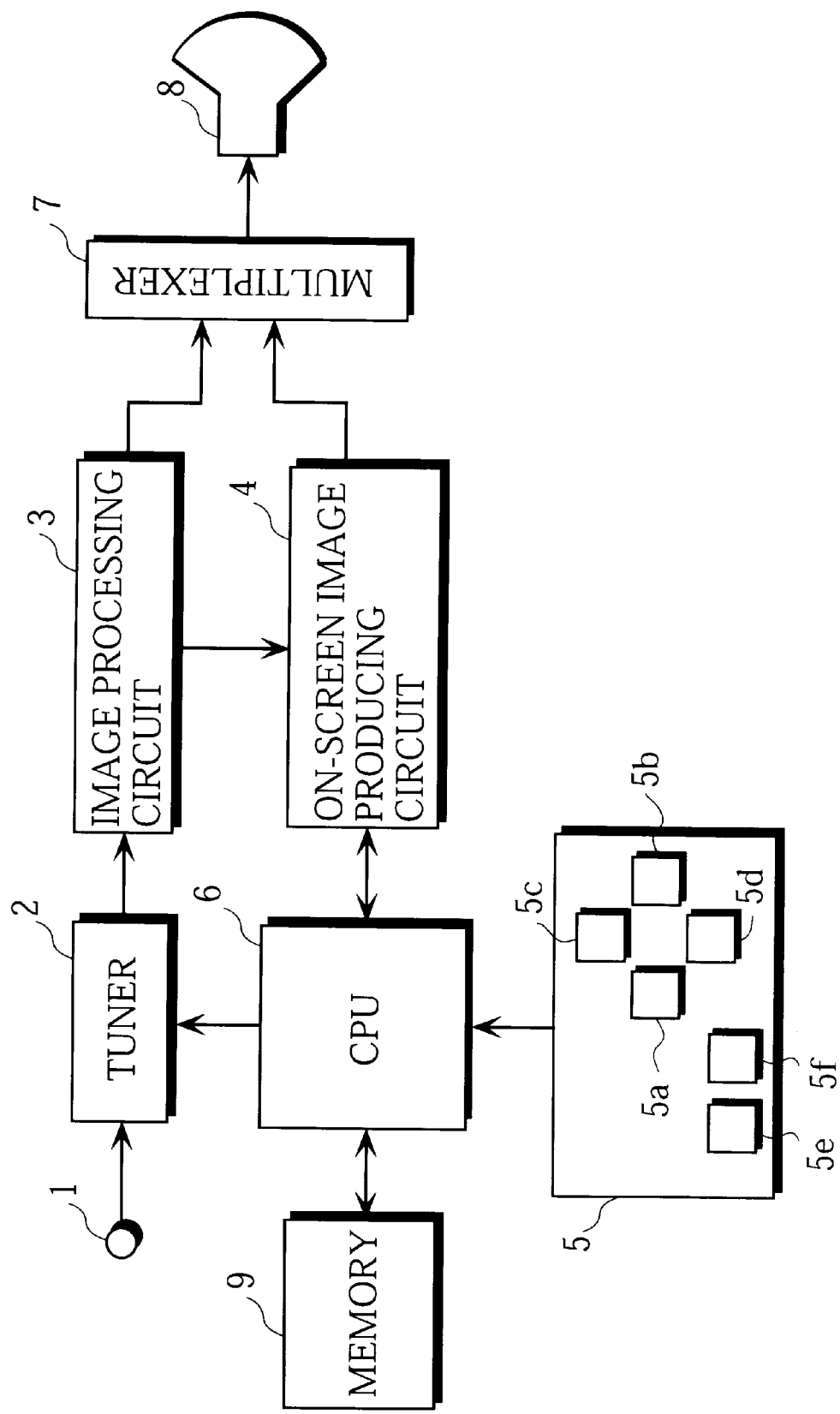
FIG. 2 is a block diagram showing the construction of a user terminal.

FIG. 2 illustrates the construction of a user terminal.

Examples of the user terminal include a combination of a television receiver and a program guide display controller or a television receiver in which a program guide display control circuit is incorporated.

In FIG. 2, reference numeral 1 denotes an input terminal, to which a signal transmitted by satellite, a cable or the like is inputted. Reference numeral 2 denotes a tuner for demodulating a signal modulated by a modulation system suitable for the transmission process and producing a base band signal. Reference numeral 3 denotes an image processing circuit for converting an output signal from the tuner 2 into a signal corresponding to a display format.

Reference numeral 4 denotes an on-screen image producing circuit for producing a menu screen, a program guide screen, or the like displayed with a program guide superimposed on images being displayed on TV (on-screen displayed). Reference numeral 5 denotes an operating section operated by a user to issue an operation command. Examples of the operating section include a remote controller. The operating section 5 is provided with leftward, rightward, upward and downward cursor moving buttons 5a, 5b, 5c and 5d, a menu button 5e, a select button 5f, and the like.

Reference numeral 6 denotes a CPU. The CPU 6 controls the on-screen image producing circuit 4 on the basis of information from the operating section 5, and controls the tuner 2 for displaying a program designated by the user on the basis of the information from the operating section 5. Reference numeral 7 denotes a multiplexer for selecting either one of an output signal of the image processing circuit 3 and an output signal of the on-screen image producing circuit 4 and outputting the selected output signal. The multiplexer 7 is controlled by the CPU 6.

Reference numeral 8 denotes a CRT (Cathode Ray Tube). Reference numeral 9 denotes a memory. The memory 9 stores necessary data such as programs of the CPU 6 and contents set by the user.

The on-screen image producing circuit 4 produces a program guide screen on the basis of program guide information sent from the satellite (one extracted in the image processing circuit 3). The program guide information includes the time when the program is started, the time when the program is terminated, the title of the program, the description of the contents of the program, and the like.

The user terminal has a function of restricting the program displayed on the program guide screen by time, a channel and a category.

Figure 3:
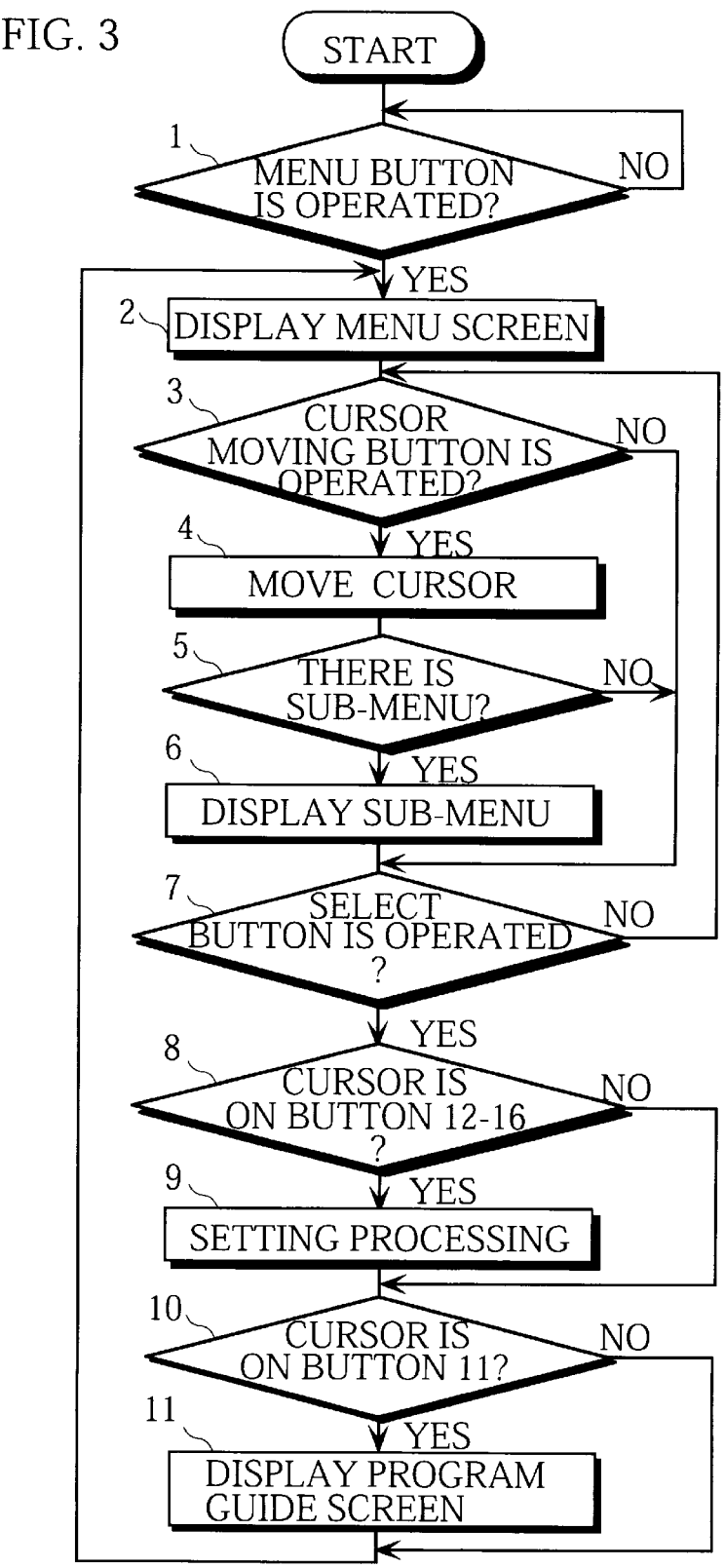
FIG. 3 is a flow chart showing the procedure for processing performed by a CPU 6.

FIG. 3 shows the procedure for processing performed by the CPU 6.

Figure 4:
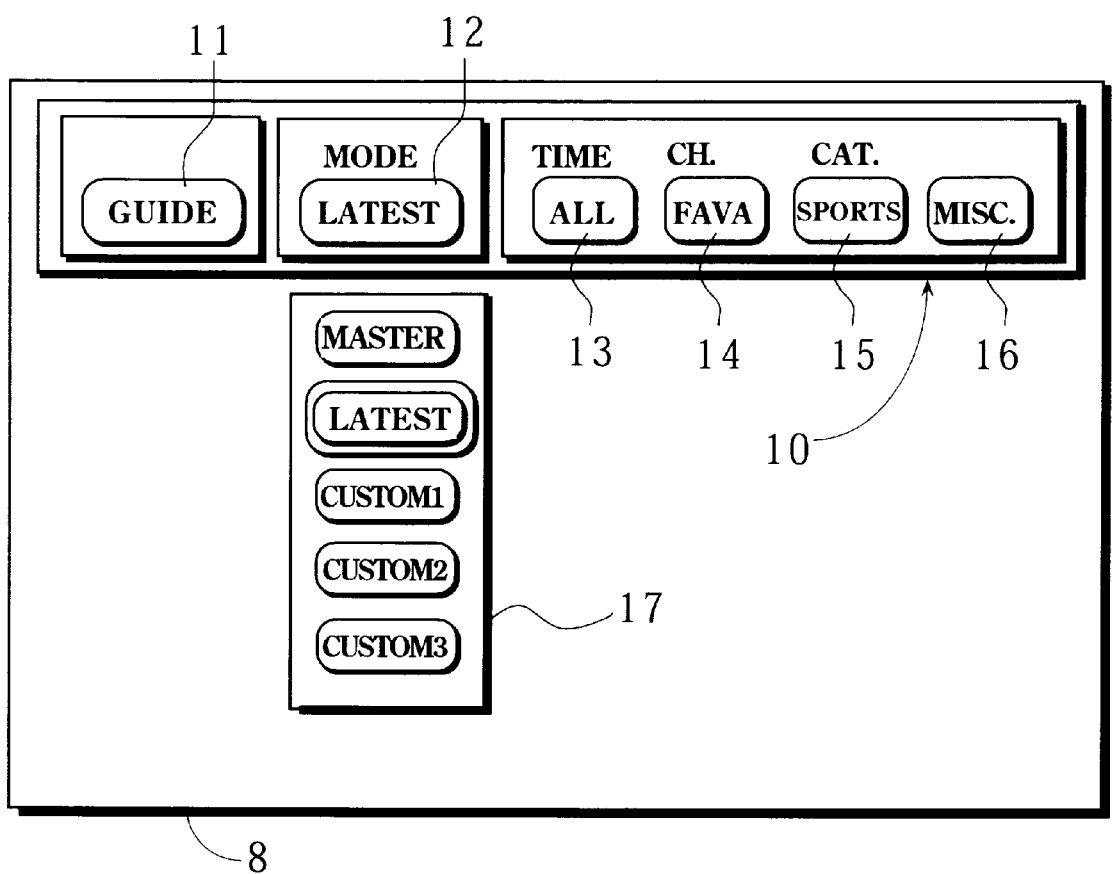
FIG. 4 is a typical view showing one example of a menu screen.

When the menu button 5e is operated (step 1), a menu screen 10 is displayed, as shown in FIG. 4, on the CRT 8 of the television receiver (step 2). The menu screen 10 is produced by the on-screen image producing circuit 4 on the basis of instructions from the CPU 6.

The menu screen 10 is displayed in the upper part of a display area of the CRT 8, and is displayed upon being superimposed on an image received by the tuner 2. The position where the menu screen 10 is displayed is determined on the basis of vertical and horizontal synchronizing signals of an image signal displayed on the CRT 8 from the image processing circuit 3.

The menu screen 10 is provided with a guide button 11 for displaying a program guide screen, a display mode setting button 12 for setting the display mode of the program guide screen, buttons 13, 14 and 15 for restricting a program displayed on the program guide screen, and a button 16 for performing the other operations.

When the menu screen 10 is displayed, a cursor is displayed. In the following description, a state where the cursor is positioned on a certain button shall mean that the button is designated by the cursor. The position where the cursor is displayed is changed by operating the cursor moving buttons 5a to 5d. The button designated by the cursor is displayed in a color different from the colors of the other buttons so that the user can easily perceive which button is designated by the cursor, which is not illustrated in FIG. 4.

When any one of the buttons 12 to 16 is designated by the cursor, a sub-menu is displayed. FIG. 4 illustrates a sub-menu 17 displayed when the display mode setting button 12 is designated. In this example, on the sub-menu 17, the cursor is positioned on an item "LATEST", and the item "LATEST" designated by the cursor is displayed in the button 12.

Specifically, when any one of the cursor moving buttons 5a to 5d is operated in a state where the menu screen 10 is displayed (step 3), the cursor is moved in a direction corresponding to the operated cursor moving button (step 4). When the button designated by the cursor is any one of the buttons 12 to 16 (YES in step 5), a corresponding sub-menus is displayed (step 6). When the sub-menu is displayed, the cursor is automatically moved onto the sub-menu.

Examples of selective items displayed on the sub-menu 17 include "MASTER", "LATEST", "CUSTOM1", "CUSTOM2", and "CUSTOM3". When the item "MASTER" is designated, the display mode of the program guide screen becomes a mode in which the program guide screen is displayed, assuming that a program displayed thereon is not restricted by time, a channel and a category.

When the item "LATEST" is designated, the display mode of the program guide screen becomes a mode in which the program guide screen is displayed on the basis of restricting contents set most recently.

When the item "CUSTOM1", "CUSTOM2" or "CUSTOM3" is designated, the display mode of the program guide screen becomes a mode in which the program guide screen is displayed on the basis of restricting contents preserved by the user as "CUSTOM1", "CUSTOM2" or "CUSTOM3".

The selective items are designated by operating the cursor moving buttons 5a to 5d to move the cursor. An area storing the restricting contents is provided in the memory 9 in correspondence to each of the items "LATEST", "CUSTOM1", "CUSTOM2" and "CUSTOM3".

Figure 5:
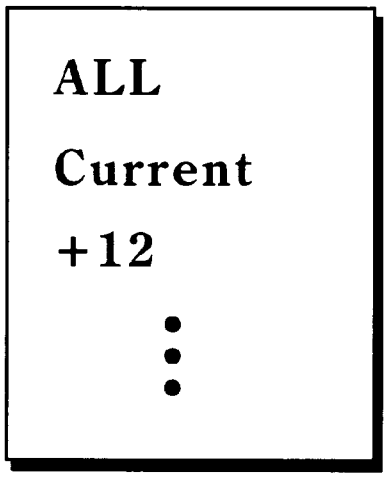
FIG. 5 is a typical view showing a sub-menu displayed when a button 13 is designated by a cursor.

FIG. 5 illustrates a sub-menu displayed when the button 13 is designated by the cursor.

The sub-menu is used for restricting a program displayed on the program guide screen by time. Examples of selective items on the sub-menu include an item "ALL" indicating that the program is not restricted by time, an item "Current" for displaying on the program guide screen only a program being currently broadcasted, and an item "+12" for displaying on the program guide screen only a program broadcasted 12 hours after the present time.

Figure 6:
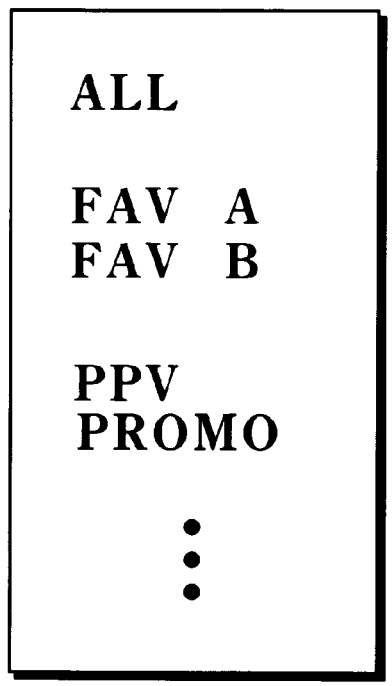
FIG. 6 is a typical view showing a sub-menu displayed when a button 14 is designated by a cursor.

FIG. 6 illustrates a sub-menu displayed when the button 14 is designated by the cursor.

The sub-menu is used for restricting a program displayed on the program guide screen by a channel. Examples of selective items on the sub-menu include an item "ALL" indicating that the program is not restricted by a channel, an item "FAV A" for making effective set contents A in which a channel frequently used by a user is previously set, an item "FAV B" for making effective set contents B in which a channel frequently used by a user is previously set, an item "PPV" for displaying on the program guide screen only a PPV program (pay per view) for which a fee must be paid only when it is viewed, and an item "PROMO" for displaying on the program guide screen only a program for advertising.

The setting of the channel frequently used by the user (the set contents A or B) is performed on the basis of a sub-menu (not shown) displayed when the button 16 is designated.

FIG. 7 illustrates a sub-menu displayed when the button 15 is designated by the cursor.

The sub-menu is used for restricting a program displayed on the program guide screen by a category. Examples of selective items on the sub-menu include an item "ALL" indicating that the program is not restricted by a category, an item "Movies" for displaying only a movie program on the program guide screen, an item "Sports" for displaying only a sports program on the program guide screen, an item "Specials" for displaying only a special program on the program guide screen, an item "Series" for displaying only a series on the program guide screen, an item "News" for displaying only a news program on the program guide screen, and an item "Shopping" for displaying only a shopping program on the program guide screen.

When the select button 5f is operated in a state where the selective item on the sub-menu is designated by the cursor (YES in step 7 and step 8), setting processing corresponding to the designated selective item is performed (step 9). Specifically, restricting contents corresponding to the selective item being currently set are written into an area storing the current setting in the memory 9, that is, an area corresponding to the item "LATEST".

Thereafter, the program is returned to the step 2. In this case, displayed contents in the buttons 12 to 15 on the menu screen 10 become displayed contents corresponding to the setting after the change. That is, the selective items being currently set are respectively displayed in the buttons 12, 13, 14 and 15 on the menu screen 10.

When the menu screen 10 is displayed by operating the menu button 5e in the operating section 5, the restricting contents stored in the area, which corresponds to the item "LATEST", in the memory 9 are made effective. The displayed contents in the buttons 12, 13, 14 and 15 become displayed contents corresponding to the restricting contents stored in the area, which corresponds to the item "LATEST", in the memory 9.

When the select button 5f is operated in a state where the bottom 11 is designated by the cursor (YES in step 7, NO in step 8, YES in step 10), a program guide screen corresponding to the display mode being currently set and restricting contents corresponding thereto is displayed on a display device (step 11). Thereafter, the program is returned to the step 2.

A program guide screen is produced by the on-screen image producing circuit 4. Specifically, the on-screen image producing circuit 4 produces, on the basis of program guide information sent from the satellite and stored, the current display mode and restricting contents corresponding to the display mode, a program guide screen adapted to the restricting contents.

Figure 8:
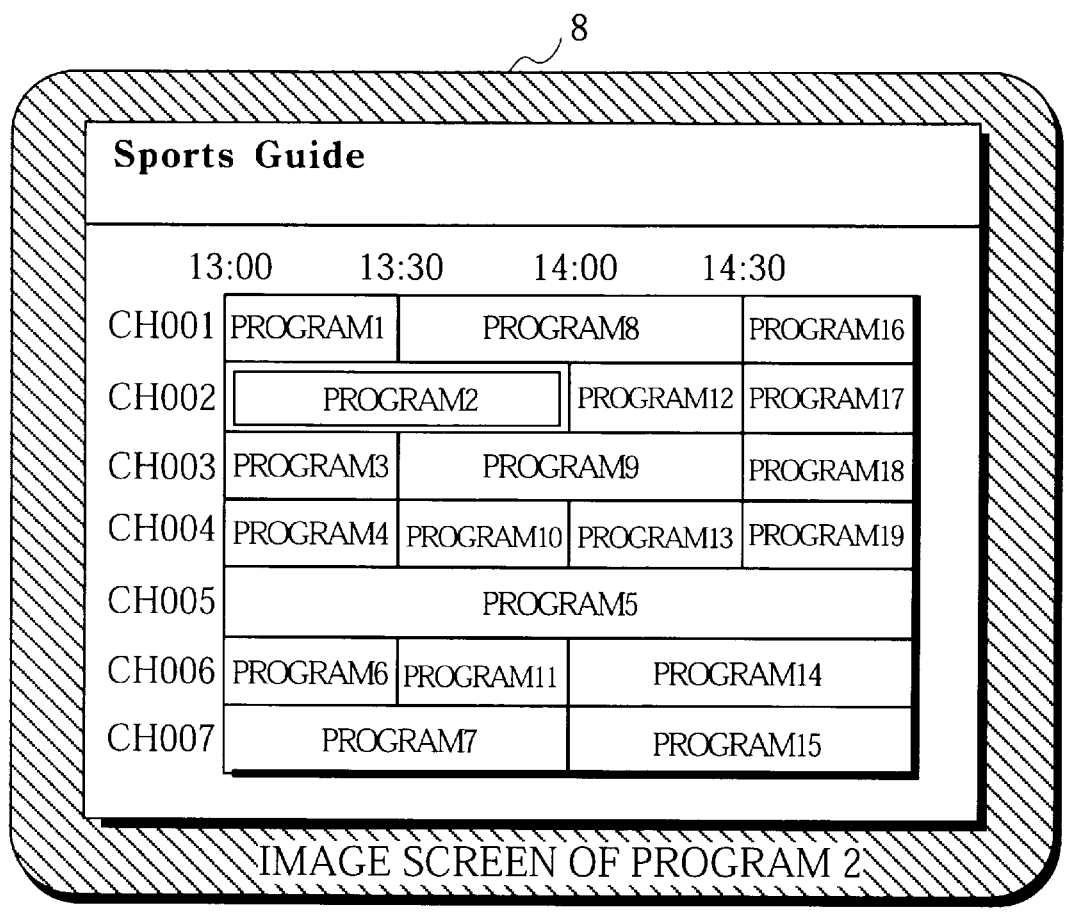
FIG. 8 is a typical view showing one example of a program guide screen.

FIG. 8 illustrates an example of a program guide screen in a case where a program is not restricted by time and a channel and a category is restricted to sports. In FIG. 8, a cursor is currently positioned on a program 2. In this state, it is possible to see parts of images of the program 2.

Figure 9:
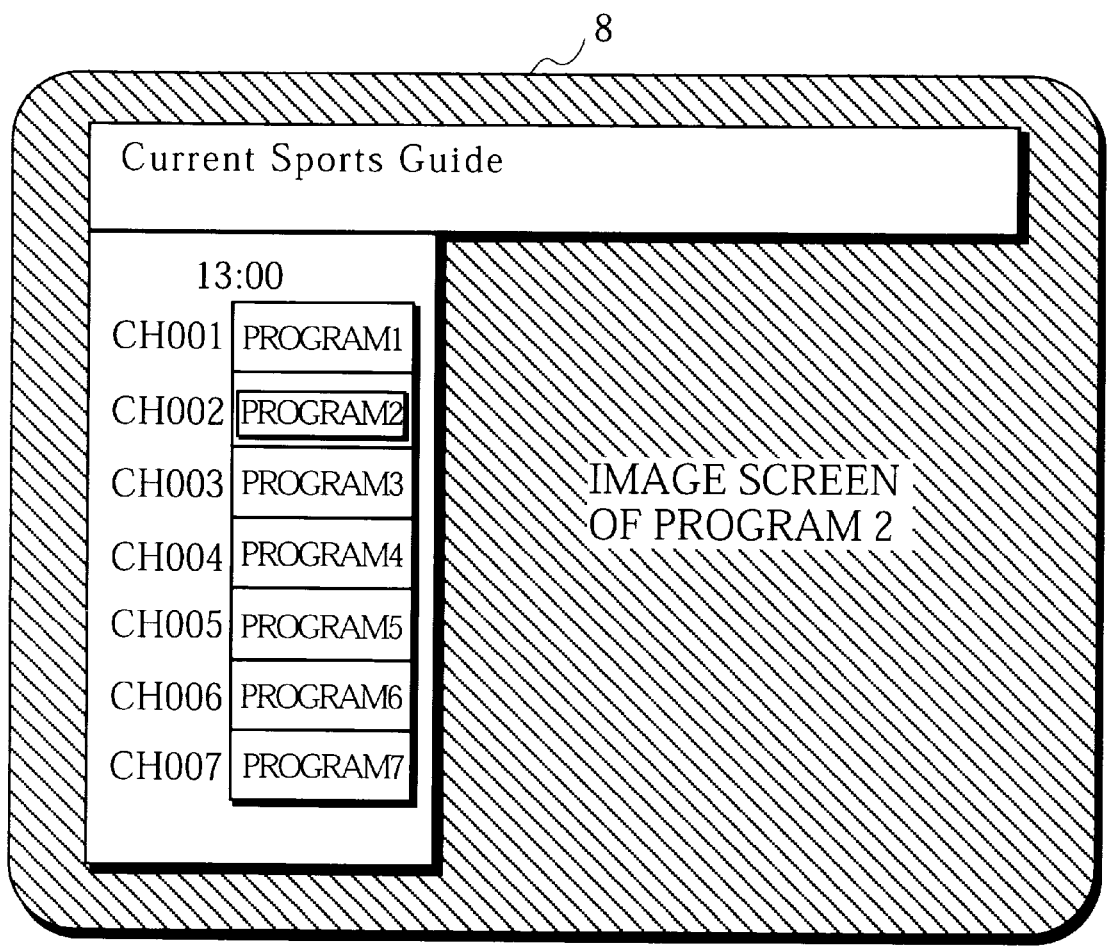
FIG. 9 is a typical view showing another example of a program guide screen.

FIG. 9 illustrates an example of a program guide screen in a case where an item "Current" is selected on a sub-menu used for restricting a program displayed on the program guide screen by time, an item "ALL" is selected on a sub-menu used for restricting the program displayed on the program guide screen by a channel, and an item "Sports" is selected on a sub-menu used for restricting the program displayed on the program guide screen by a category.

In this case, only programs being currently broadcasted are displayed in one column on the program guide screen, whereby it is possible to see significant parts of images of the program being currently tuned in to. Consequently, a user can select a program while actually confirming the contents of the program. Although in FIG. 9, the program guide screen is displayed in the left end of the display area of the CRT 8, it is also possible to display the program guide screen in the right end or the upper and lower ends.

Operations where each of the items is selected on the sub-menu 17 for selecting the display mode are described.

When the item "LATEST" is selected, the restricting contents of time, the restricting contents of a channel and the restricting contents of a category which are stored in the area, which corresponds to the item "LATEST", in the memory 9 are made effective. In this case, the displayed contents in the button 12 become "LATEST", and the displayed contents in the buttons 13, 14 and 15 become displayed contents corresponding to the restricting contents stored in the area, which corresponds to the item "LATEST", in the memory 9.

When the item "MASTER" is selected, "ALL" is stored in the area, which corresponds to "LATEST", in the memory 9 as the restricting contents of time, the restricting contents of a channel and the restricting contents of a category. The restricting contents stored in the area, which corresponds to the item "LATEST", in the memory 9 are made effective. That is, the program is not restricted with respect to time, a channel and a category. In this case, the displayed contents in the button 12 become "MASTER", and all the displayed contents in the buttons 13, 14 and 15 become "ALL".

Furthermore, when any one of the items "CUSTOM1" to "CUSTOM3" is selected, the restricting contents of time, the restricting contents of a channel and the restricting contents of a category are read out from an area, which corresponds to the selective item, in the memory 9, and are written into the area, which corresponds to the item "LATEST", in the memory 9. The restricting contents stored in the area, which corresponds to the item "LATEST", in the memory 9 are made effective. In this case, the displayed contents in the button 12 become contents corresponding to the item selected out of the items "CUSTOM1" to "CUSTOM3", and the displayed contents in the buttons 13, 14 and 15 become displayed contents corresponding to the restricting contents stored in the area, which corresponds to the item "LATEST", in the memory 9.

The restricting contents are stored in any one of the areas, which correspond to the items "CUSTOM1" to "CUSTOM3", in the memory 9 on the basis of a sub-menu (not shown) displayed when the button 16 is designated. That is, selective items on the sub-menu (not shown) displayed when the button 16 is designated include an item for storing therestricting contents being currently set in any one of the areas corresponding to the items "CUSTOM1" to "CUSTOM3" in the memory 9.

As the display mode of the program guide screen, there may be provided an entire screen display mode shown in FIG. 1, a time priority mode shown in FIG. 10, and a channel priority mode shown in FIG. 11. On the program guide screen shown in FIG. 10, periods of time are displayed upon being divided between upper and lower stages. On the program guide screen shown in FIG. 11, groups of channels are displayed upon being divided between right and left columns. When the three display modes are provided, the operating section 5 is provided with a page button (not shown) for switching pages.

When the page button is operated in a case where the entire screen display mode is set, the screen is updated for displaying next page of the program guide. When the page button is operated in a case where the time priority mode or the channel priority mode is set, the screen is not updated, and the cursor is only moved.

Cursor movement in a case where the page button is operated when the time priority mode is set is now described. When the page button is operated in a case where the cursor is positioned on a program A shown in FIG. 10, the cursor is moved onto a program S. When the page button is pressed again, the cursor is returned to a program D.

Cursor movement in a case where the page button is operated when the channel priority mode is set is now described. When the page button is operated in a case where the cursor is positioned on a program M shown in FIG. 11, the cursor is moved onto a program CC. When the page button is operated again, the cursor is returned to the program M.

Operations performed when the cursor moving buttons 5a to 5d are operated in a case where the time priority mode is set are now described. When any one of the cursor moving buttons 5a to 5d is operated, the cursor is moved by a cell in a direction corresponding to the operated cursor moving button. Each cell corresponds to each TV program. When the rightward moving button 5b is further operated in a case where the cursor is positioned on a program G shown in FIG. 10, however, both an upper half screen and a lower half screen are simultaneously scrolled. Specifically, the range of time displayed is in the range of 7:30 to 11:30. That is, the range of the time displayed on the upper half screen is from 7:30 to 9:30, and the range of the time displayed on the lower half screen is in the range of 9:30 to 11:30. The cursor is moved to the program S displayed on the upper half screen.

When the downward cursor moving button 5d is operated in a case where the cursor is positioned on a program I, the range of channels displayed on both the upper half screen and the lower half screen is from Channel 2 to Channel 4.

Operations performed when the cursor moving buttons 5a to 5d are operated in a case where the channel priority mode is set are now described. When any one of the cursor moving buttons 5a to 5d is operated, the cursor is moved by a cell in a direction corresponding to the operated cursor moving button. When the downward moving button 5d is further operated in a case where the cursor is positioned on a program P shown in FIG. 11, the range of channels displayed is from Channel 2 to Channel 7 on the left half screen, while being from Channel 8 to Channel 13 on the right half screen.

On the other hand, when the leftward cursor moving button 5a is operated in a case where the cursor is positioned on a program H, the range of time displayed on both the upper half screen and the lower half screen is from 6:30 to 7:30.

[2] Description of Second Embodiment

Programs presented in the DSS include a free program which can be viewed for nothing if a fee for using the system such as a fee for admission to the DSS and a basic fee is paid and a pay program for which a fee must be paid in addition to the fee for using the system. Examples of the pay program include one which is previously purchased for each channel and one for which a fee is paid only when it is viewed (PPV: pay per view). In order to view the PPV program, a purchase procedure must be carried out on a television screen before the program is started or when the program is being broadcasted.

Figure 12:
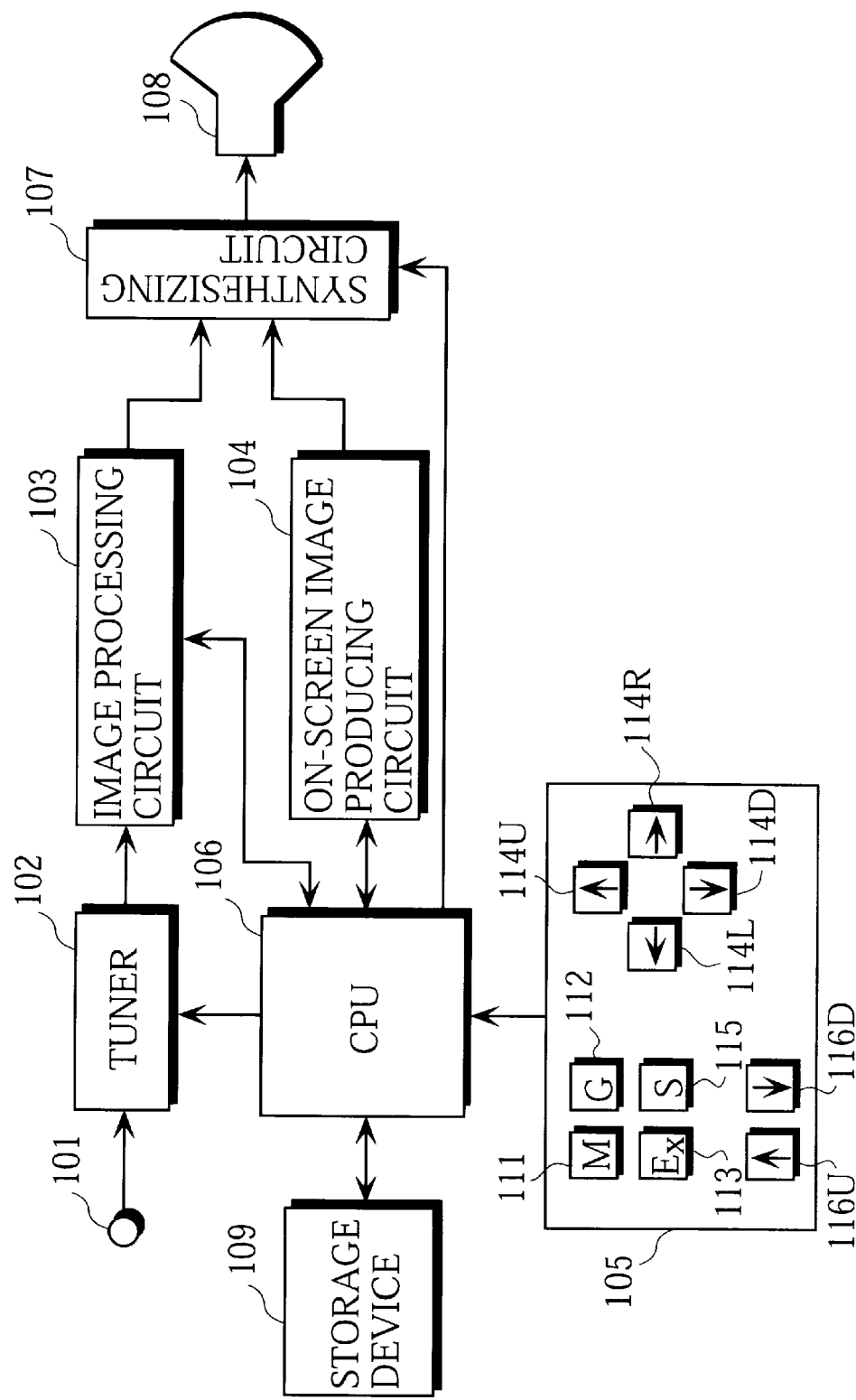
FIG. 12 is a block diagram showing the construction of a user terminal.

FIG. 12 illustrates the construction of a user terminal.

Examples of the user terminal include a combination of a television receiver and a program guide display controller or a television receiver in which a program guide display control circuit is incorporated. The user terminal comprises a CPU 106 for controlling the whole of the user terminal. The CPU 106 comprises a storage device 109 for storing its programs and necessary data. An operating section 105 composed of a remote controller or the like is connected to the CPU 106.

The CPU 106 controls a tuner 102 for displaying a program selected by the operating section 105 and controls an on-screen image producing circuit 104 for producing an on-screen image which is displayed upon being superimposed on a television broadcasting image. Examples of the on-screen image include a screen which is a combination of a menu screen and a program guide screen, a screen in each hierarchy corresponding to the menu screen, and a screen in each hierarchy corresponding to the program guide screen.

A high-frequency signal is inputted from a parabolic antenna (not shown) to an input terminal 101. The signal inputted to the input terminal 101 is sent to the tuner 102. In the tuner 102, processing such as frequency conversion and QPSK (Quadrature Phase-Shift Keying) demodulation is performed, and a stream of a digital image signal is produced. An output of the tuner 102 is sent to an image processing circuit 103.

In the image processing circuit 103, the stream outputted from the tuner 102 is MPEG-decoded, and an image signal to be displayed on a display device 108 such as a CRT is generated. The image signal is sent to the display device 108 through a synthesizing circuit 107, so that the image signal is displayed on the display device 108.

Furthermore, the image processing circuit 103 extracts program guide information and time information representing the present time from the output of the tuner 102, and supplies the extracted information to the CPU 106. The program guide information and the time information which are supplied to the CPU 106 are stored in the storage device 109. The storage device 109 further previously stores information for producing various types of on-screen images, and stores information relating to a PPV program purchased, information relating a PPV program viewed, and the like.

The CPU 106 produces on-screen data on the basis of entry from the operating section 105 or the like and information for producing various types of on-screen images stored in the storage device 109. The on-screen data produced by the CPU 106 is sent to the on-screen image producing circuit 104.

The on-screen image producing circuit 104 produces on-screen image data on the basis of the on-screen data sent from the CPU 106. The on-screen image data produced by the on-screen image producing circuit 104 is sent to the display device 108 through the synthesizing circuit 107, so that the on-screen image data is displayed on the display device 108. The synthesizing circuit 107 synthesizes an output of the image processing circuit 103 and an output of the program guide image producing circuit 104 and supplies a composite output to the display device 108.

The operating section 105 is provided with a menu key 111 for making the menu screen active, a guide key 112 for making the program guide screen active, an Exit key 113 for erasing the menu screen and the program guide screen, four cursor moving keys 114L, 114R, 114U and 114D for moving the cursor in the right and left directions and up and down directions, a select key 115 for making selective entry, channel UP/DOWN keys 116U and 116D for changing the channel in the up direction or the down direction, and the like.

Figure 13:
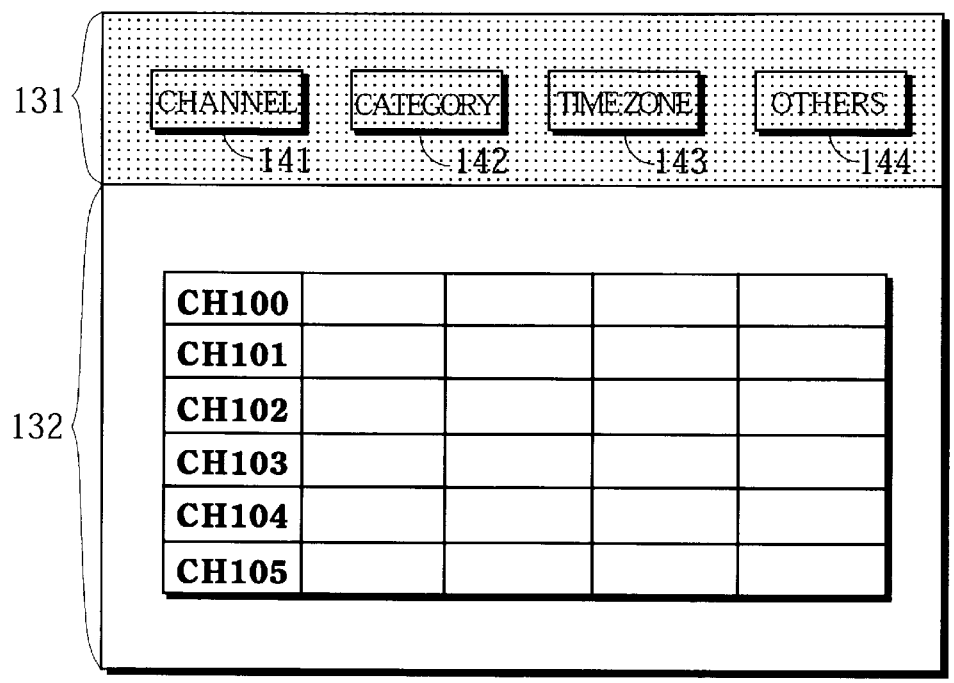
FIG. 13 is a typical view showing an on-screen image displayed when a menu key 111 in an operating section 105 is pressed.
Figure 14:
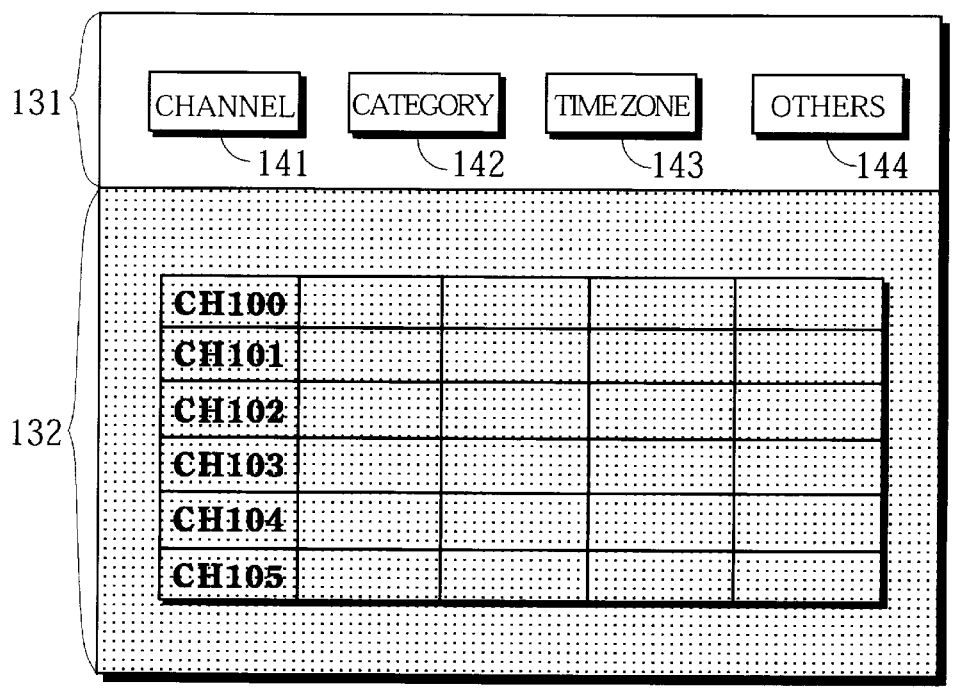
FIG. 14 is a typical view showing an on-screen image displayed when a guide key 112 in an operating section 105 is pressed.

When the menu key 111 or the guide key 112 in the operating section 5 is pressed, a screen which is a combination of a menu screen 131 and a program guide screen 132 is displayed as an on-screen image, as shown in FIG. 13 or 14. A channel setting button 141 for restricting a channel of a program guide displayed on the program guide screen 132, a category setting button 142 for setting a category of the program guide displayed on the program guide screen 132, a time period setting button 143 for setting the time when the program guide displayed on the program guide screen 132 is started, and a button 144 for performing other settings are displayed on the menu screen 131. Contents set by the setting buttons 141, 142 and 143 are also displayed on the menu screen 131.

When the menu key 111 in the operating section 105 is pressed, the menu screen 131 is made active, and the program guide screen 132 is made inactive, as shown in FIG. 13. When the menu screen 131 is active, a cursor can be moved on the respective setting buttons 141 to 144 on the menu screen 131. When any one of the buttons is designated by the cursor, a sub-menu is displayed. The setting buttons 141 to 143 for restricting a program displayed on the program guide screen 132 are designated by the cursor. When the set contents are changed, the set contents displayed on the menu screen 131 are changed, and displayed contents on the program guide screen 132 which is inactive are also updated depending on the change of the setting.

When the guide key 112 in the operating section 105 is pressed, the program guide screen 132 is made active, and the menu screen 131 is made inactive, as shown in FIG. 14. When the program guide screen 132 is active, the contents of the program guide screen 132 which correspond to restricting contents displayed on the menu screen 131 are displayed. In this case, the cursor can be moved on a program displayed on the program guide screen, and the program is designated by the cursor, whereby the program is tuned in to, and the explanation for the contents of the program is displayed. In FIGS. 13 and 14, the screen indicated by stippling is active.

Specifically, information related to each other are displayed between the menu screen 131 and the program guide screen 132. For example, restricting contents on the program guide screen 132 are displayed on the menu screen 131. When the restricting contents are changed on the menu screen 131, the displayed contents on the program guide screen 132 are updated as the restricting contents are changed.

When the menu key 111 or the guide key 112 in the operating section 105 are pressed, a screen which is a combination of the menu screen 131 and the program guide screen 132 is displayed. The cursor is movable only in the screen which is active, and cannot be moved from the screen which is active to the screen which is not inactive.

In order to make it easy to visually determine which of the menu screen 131 and the program guide screen 132 is active, the active screen is displayed by opacity, and the inactive screen is displayed by halftones in the present embodiment.

Figure 15:
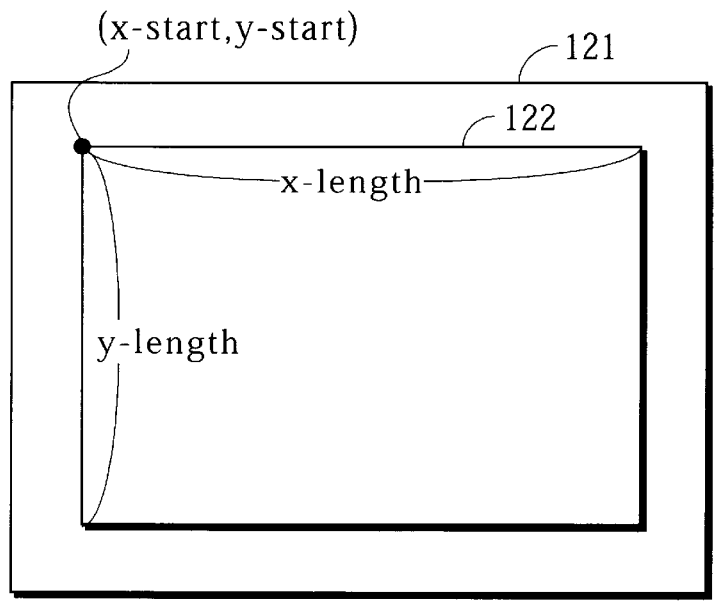
FIG. 15 is a typical view showing an image area 121 and an on-screen image display area 122.

FIG. 15 illustrates an image area 121 and an area where an on-screen image is displayed (an on-screen image display area) 122. The image area 121 is an area where a television program is broadcasted on TV, for example, an area having dimensions of 480 pixels by 720 pixels.

The on-screen image display area 122 differs in dimensions depending on various types of on-screen images. The on-screen image display area 122 is specified by its positional information, that is, information representing the coordinate position (x—start, y—start) at the upper left end of the area and the dimensions thereof, that is, the length in the transverse direction (x—length) and the length in the longitudinal direction (y—length).

The on-screen image is drawn by color pallets 0 to 15, for example. RGB data and transmittance are designated for each pallet. The color pallets 0 to 3 are used for drawing the cursor. The color pallets 4 to 9 are used for drawing the menu screen 131. The color pallets 10 to 15 are used for drawing the program guide screen 132.

Figure 16:
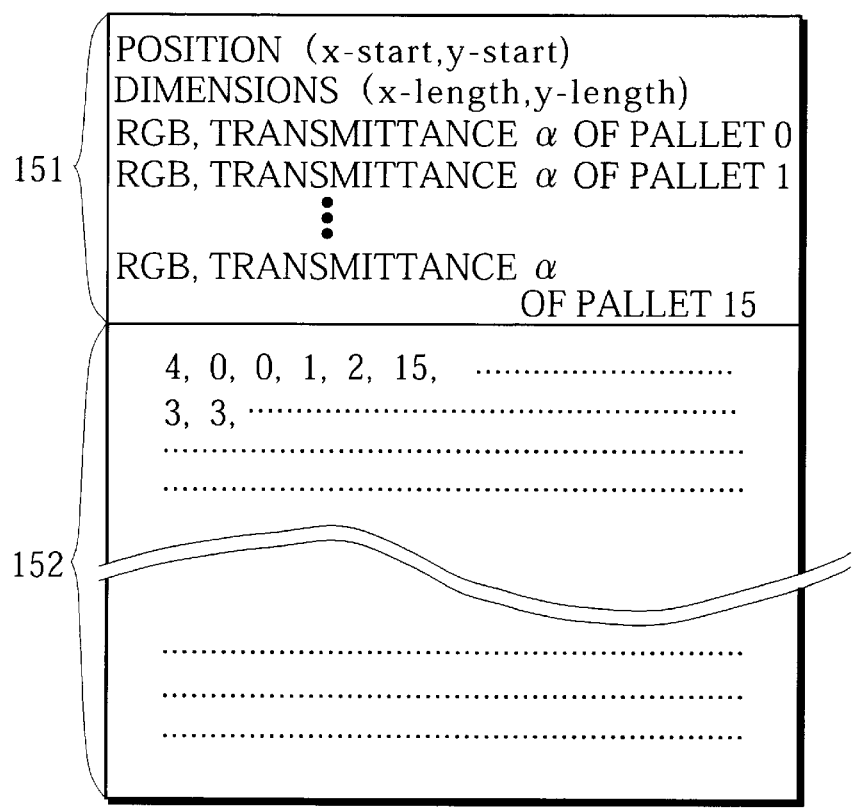
FIG. 16 is a typical view showing the data structure of on-screen data.

On-screen data produced by the CPU 106 comprises a header portion 151 and a pixel data portion 152, as shown in FIG. 16. Data relating the position of an area where the on-screen image is to be displayed (x—start, y—start) and data relating to the dimensions of the area (x—length, y—length), and RGB data and transmittance α for each of the color pallets 0 to 15 are described in the header portion 151. Data representing a pallet number corresponding to each of pixels constituting the on-screen image is described in the pixel data portion 152.

When the on-screen data is sent to the on-screen image producing circuit 104, the on-screen image producing circuit 104 produces RGB data and transmittance α corresponding to each of the pixels constituting the on-screen image on the basis of the color pallet number corresponding to the pixel described in the image data portion 152 of the sent on-screen data and the contents of the header portion 151, and outputs them to the synthesizing circuit 107.

Figure 17:
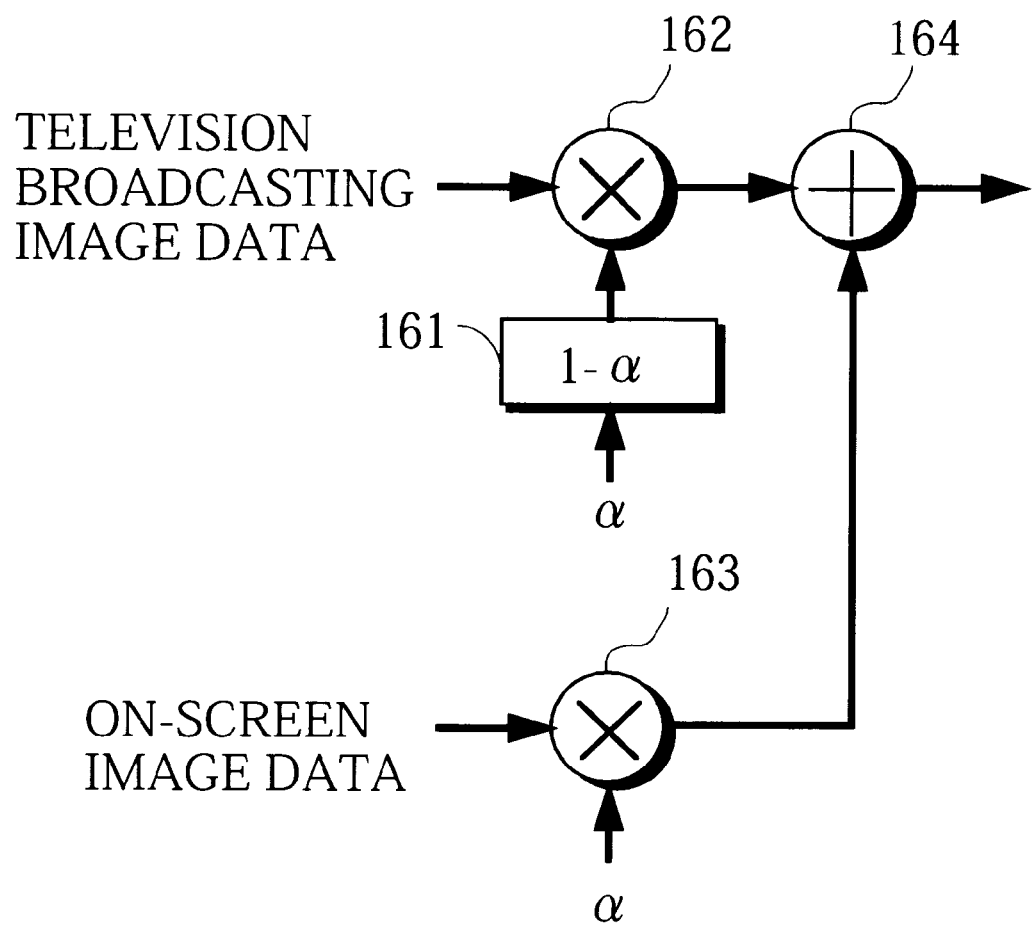
FIG. 17 is a circuit diagram showing the construction of a synthesizing circuit 107.

FIG. 17 illustrates the construction of the synthesizing circuit 107.

The synthesizing circuit 107 is constituted by an computing unit 161 for performing an operation of (1-α), a first multiplier 162 for multiplexing image data sent from the image processing circuit 103 by an output value of the computing unit 161, a second multiplier 163 for multiplying image data (RGB data) sent from the on-screen image producing circuit 104 by transmittance α, and an adder 164 for adding an output of the first multiplier 162 and an output of the second multiplier 163.

When the transmittance α is one, therefore, only the image data sent from the on-screen image producing circuit 107 (on-screen image data) is outputted from the synthesizing circuit 107. In this case, therefore, in an area where an on-screen image is displayed, only the on-screen image is seen.

When the transmittance α is zero, only the image data sent from the image processing circuit 103 (television broadcasting image data) is outputted from the synthesizing circuit 107. In this case, therefore, only a television broadcasting image is displayed.

When the transmittance α is approximately 0.5, the television broadcasting image can be seen through the on-screen image. When the transmittance α is more than zero and less than one, the larger the transmittance α is, the higher the ratio of the on-screen image in a composite image of the on-screen image and the television broadcasting image is.

Figure 18:
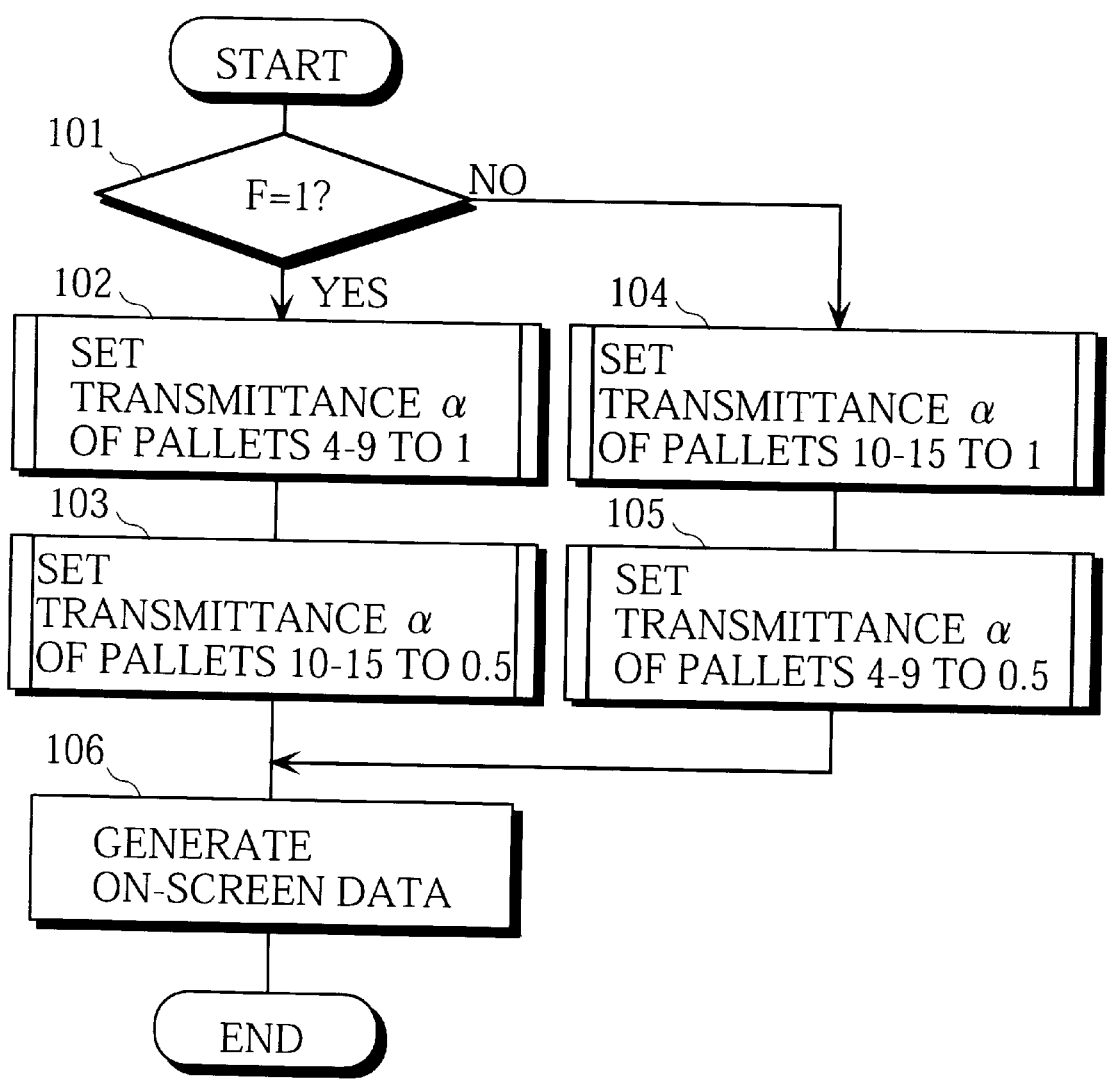
FIG. 18 is a flow chart showing the procedure for on-screen data generating processing performed when entry of an operation for displaying an on-screen image is made.

FIG. 18 shows the procedure for on-screen data generating processing performed when operation entry for displaying an on-screen image is made.

A case where operation entry for displaying an on-screen image is made means a case where the menu key 111 or the guide key 112 is pressed, a case where operation entry for displaying an on-screen image in each hierarchy on the menu screen is made, or a case where operation entry for displaying an on-screen image in each hierarchy on a program guide screen is made.

The storage device 109 stores an active screen judgment flag F for storing data indicating which of the menu screen and the program guide screen is active. The flag F is set (F=1) when the menu key 111 is pressed, while being reset (F=0) when the guide key 112 is pressed.

Furthermore, the storage device 109 previously stores a reference pallet table storing RGB data and transmittance for each color pallet (each of the color pallets 0 to 15). In initialization in turning the power supply on, a working pallet table having the same contents as those of the reference pallet table is produced on the basis of the reference pallet table.

When operation entry for displaying an on-screen image is made, it is judged whether or not the active screen judgment flag F is first set (step 101).

When the active screen judgment flag F is set, the menu screen is active. In order to make the menu screen opaque, therefore, the transmittance α of each of the color pallets 4 to 9 used with respect to a menu screen in the working pallet table is set to one (step 102). Further, in order to bring the program guide screen into halftones, the transmittance α of each of the color pallets 10 to 15 used with respect to a program guide screen in the working pallet table is set to 0.5 (step 103). Thereafter, the program proceeds to the step 106.

When the active screen judgment flag F is not set in the step 101, the program guide screen is active. In order to make the program guide screen opaque, therefore, the transmittance α of each of the color pallets 10 to 15 used with respect to the program guide screen in the working pallet table is set to one (step 104). Further, in order to bring the menu screen into halftones, the transmittance α of each of the color pallets 4 to 9 used with respect to the menu screen in the working pallet table is set to 0.5 (step 105). Thereafter, the program proceeds to the step 106.

In the step 106, on-screen data corresponding to an on-screen image to be currently displayed is generated. In this case, the contents of the working pallet table are used as RGB data and transmittance for each of the color pallets (the color pallets 1 to 15) described in the header portion 151 of the on-screen data. Consequently, the transmittance α of each of the color pallets 4 to 9 in the header portion 151 of on-screen data generated when the menu screen is active is one, and the transmittance α of each of the color pallets 10 to 15 is 0.5. As a result, when the menu screen is active, an on-screen image corresponding to the menu screen is displayed by opacity, and an on-screen image corresponding to the program guide screen is displayed by halftones.

On the other hand, the transmittance α of each of the color pallets 4 to 9 in the header portion 151 of the on-screen data generated when the program guide screen is active is 0.5, and the transmittance α of each of the color pallets 10 to 15 is one. As a result, when the program guide screen is active, an on-screen image corresponding to the program guide screen is displayed by opacity, and an on-screen image corresponding to the menu screen is displayed by halftones.

[3] Description of Third Embodiment

Figure 19:
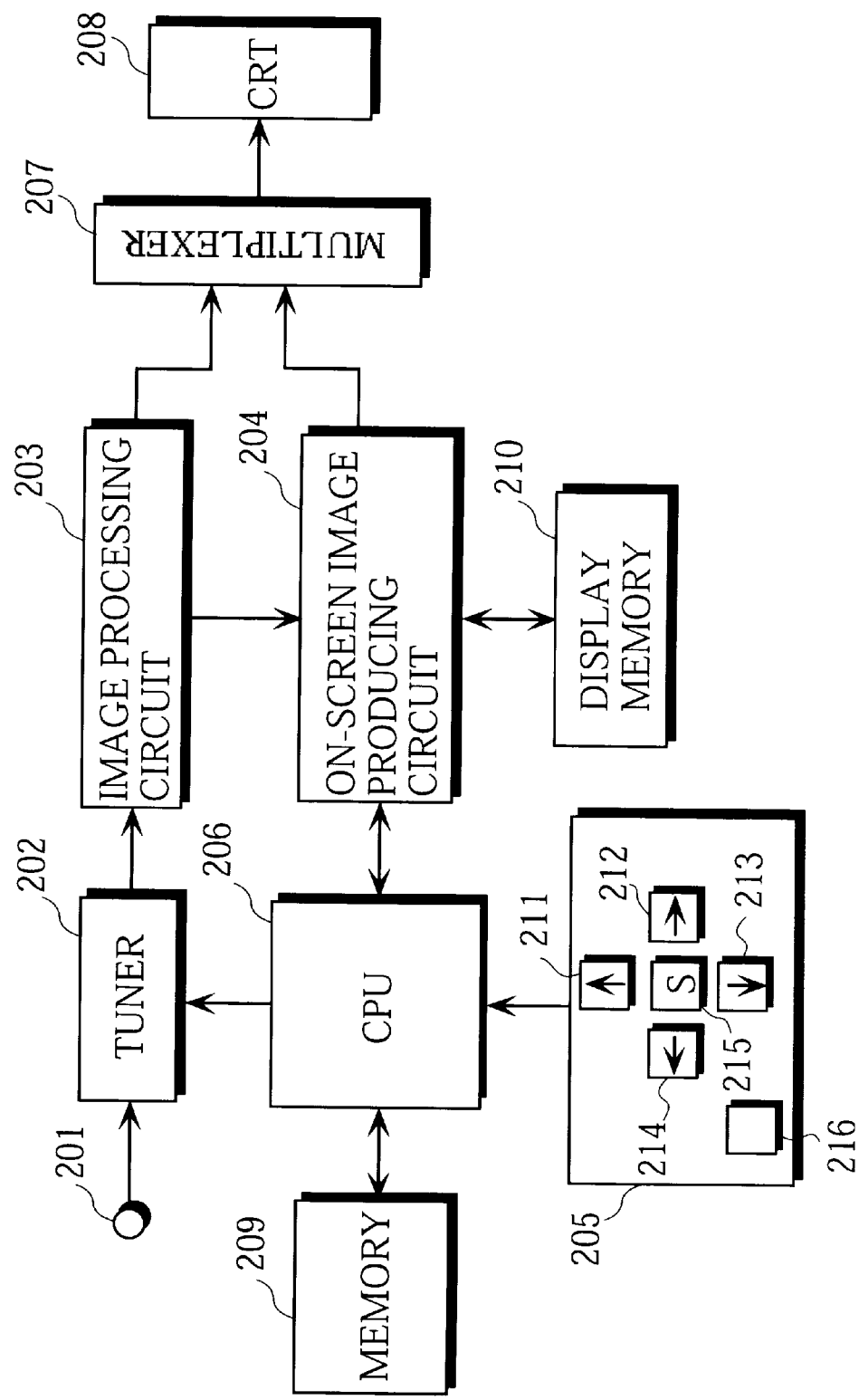
FIG. 19 is a block diagram showing the construction of a user terminal.

FIG. 19 illustrates the construction of a user terminal.

A high-frequency signal from a parabolic antenna (not shown) is inputted to an antenna input terminal 201. A tuner 202 inputs the high-frequency signal, to perform processing such as frequency conversion and QPSK demodulation, and outputs a stream of a digital image signal.

An image processing circuit 203 MPEG-decodes an output of the tuner 202, and converts the output into an analog image signal to be displayed on a CRT 208, for example, an NTSC (National Television System Committee) signal. Further, the image processing circuit 203 extracts program guide information transmitted simultaneously with image data of programs, and supplies the information to an on-screen image producing circuit 204.

A CPU 206 controls the whole of the user terminal. Programs of the CPU 206 and other necessary data are stored in a memory 209. An input section 205 is composed of a keyboard or a remote controller.

The on-screen image producing circuit 204 produces an on-screen image on the basis of the output of the tuner 202 and an output of the CPU 206. A signal generated by the on-screen image producing circuit 204 is supplied to the CRT 208 through a multiplexer 207.

Display data produced by the on-screen image producing circuit 204 is written into a display memory 210. The contents of the display memory 210 are displayed on the CRT 208. When the contents of the display memory 210 are changed, therefore, contents displayed on the CRT 208 are also changed.

Figure 20:
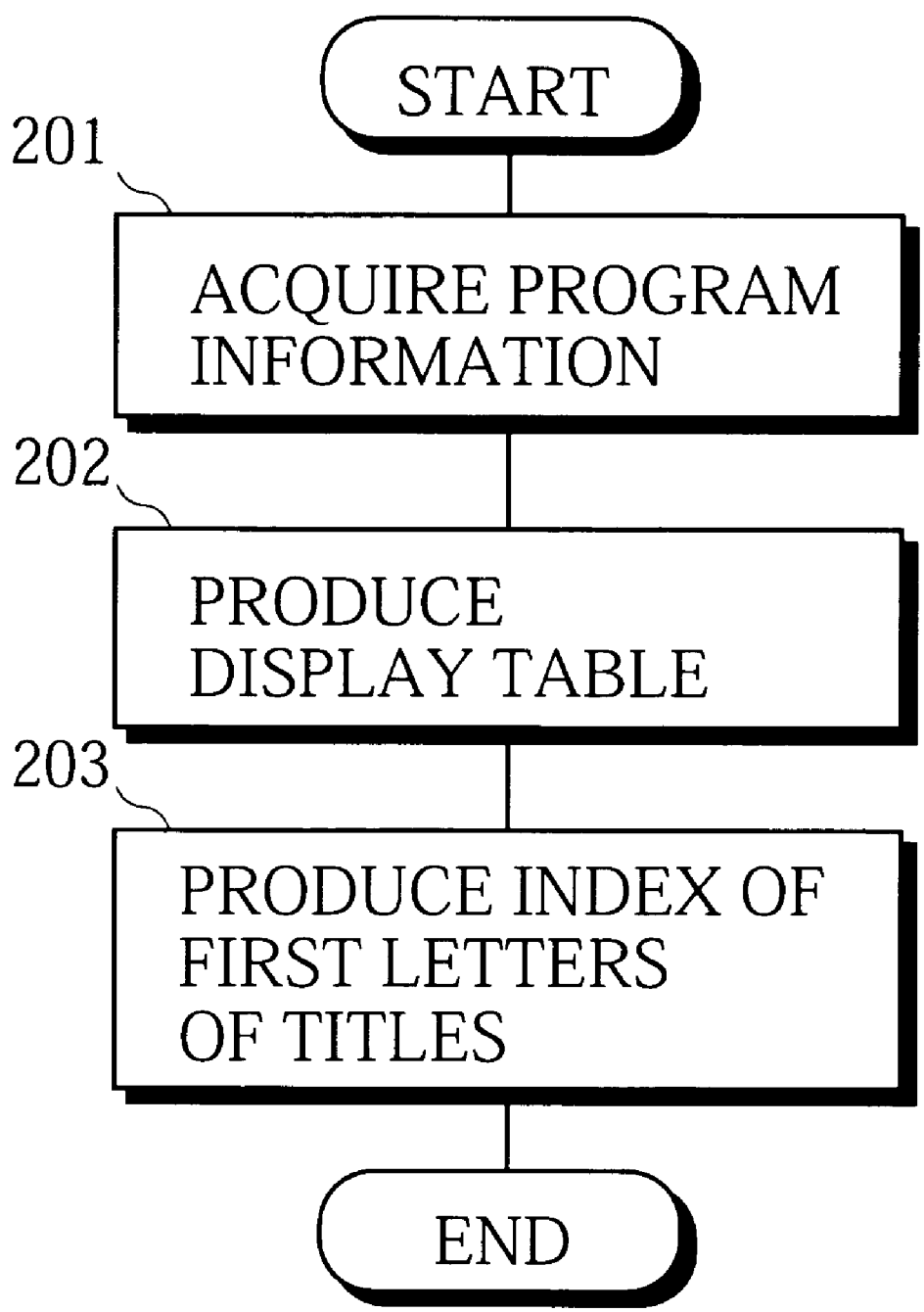
FIG. 20 is a flow chart showing the procedure for processing for producing a display table and an index of the first letters of the titles of programs.

FIG. 20 shows the procedure for processing for producing a display table and an index of the first letters of the titles of programs. The on-screen image producing circuit 204 comprises a working memory (not shown) in its inside, and acquires program guide information obtained from the image processing circuit 203 and stores the information in the working memory (step 201). The program guide information includes, with respect to each of programs being currently broadcasted and programs to be broadcasted in the future (for example, within 48 hours after the present time), information such as the title of the program, the number of the program channel, the time when the program is started, the time when the program is terminated, the genre of the program, the simple introduction of the contents of the program, and main performers. The program guide information is transmitted simultaneously with image information of programs.

A display table on which respective programs are so listed that the titles thereof are arranged in alphabetical order is produced in the working memory on the basis of the stored program guide information (step 202). The display table includes at least the titles of the programs and the time when each of the programs is started.

An index of the first letters of the titles of the programs is produced on the basis of the display table, and is stored in the memory 209 (step 203). The index is a numeral indicating how many letters are there from the head of the display table to each of the first letters "A" to "Z" of the titles of the programs (an offset value). For example, the offset value corresponding to the first letter "A" is 0, and the offset value corresponding to the first letter "B" is 30.

The input section 205 is provided with at least cursor buttons 211 to 214, a select button 215, and a list display button 216. When any one of the cursor buttons 211 to 214 is pressed, the input section 205 is so controlled by the CPU 206 that a cursor displayed on a screen of the CRT 208 is moved in a direction indicated by an arrow in the pressed cursor button. The select button 215 is utilized for designating any processing by a user. Further, when the list display button 216 is operated, the programs are listed.

Figure 21:
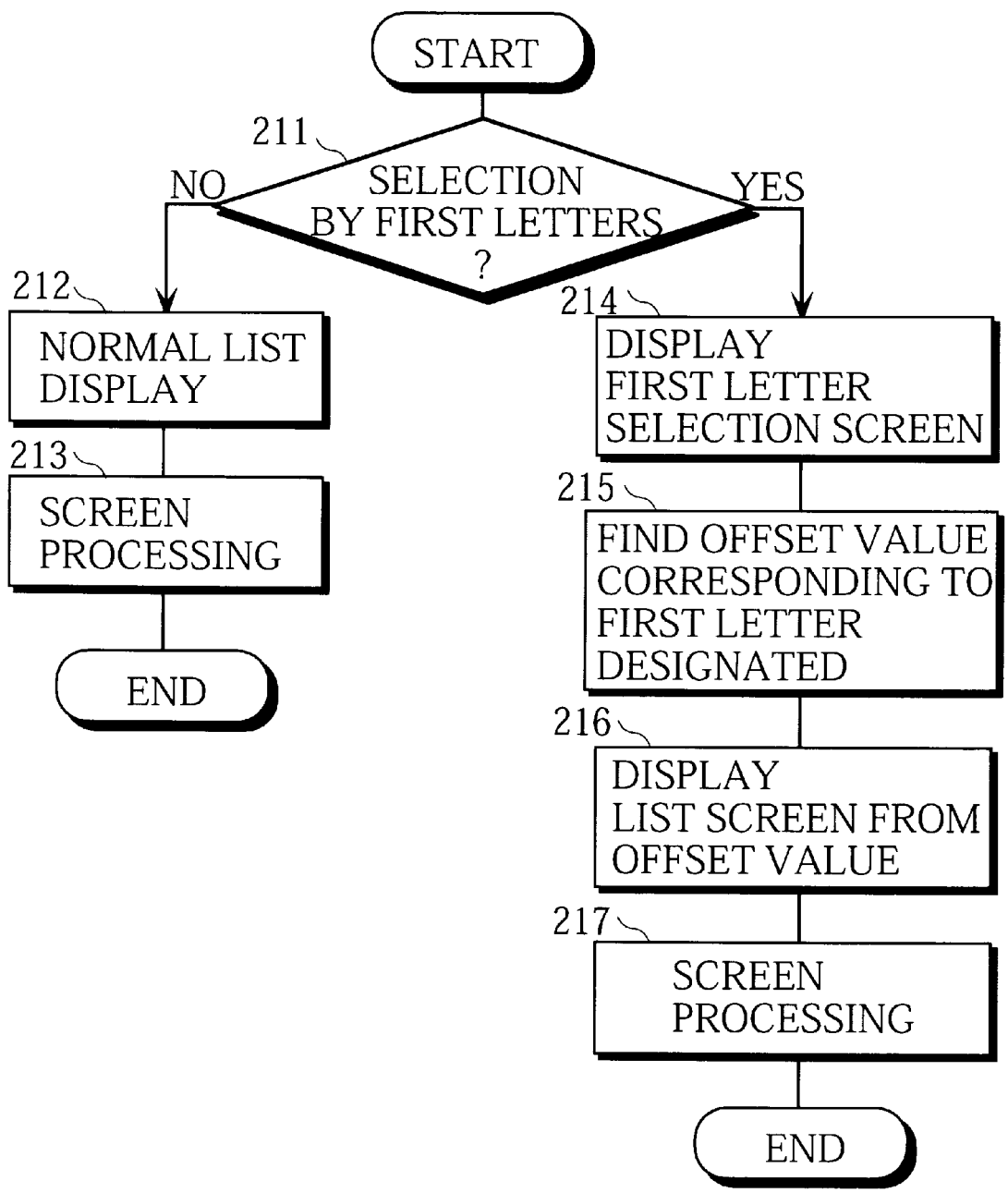
FIG. 21 is a flow chart showing the procedure for processing performed when a list display button 216 is operated.

FIG. 21 shows the procedure for processing performed when the list display button 216 is operated.

When the list display button 216 is operated, a selection screen relating to a method of displaying a list is first displayed (not shown), to inform the user whether or not selection is carried out by the first letters (step 211). The user indicates whether or not selection is carried out by the first letters using the cursor buttons 211 to 214 and the select button 215.

When normal list display is selected without selecting the first letters, the program proceeds to the step 212. In the step 212, processing for displaying the contents of the display table stored in the working memory of the on-screen image producing circuit 204, beginning with the first program. Specifically, the contents of the display table are successively written into the display memory 210 so that the programs are displayed in a predetermined format, for example, a format shown in FIG. 22 (a format which is constituted by the title of a program and the time when the program is started).

When the user operates the cursor buttons 211 and 213 on the normal list display screen, the cursor on the screen is moved. A program designated by the cursor (denoted by reference numeral 260 in FIG. 22) is so displayed as to be distinguished from the other program. For example, the program designated by the cursor and the other program are so displayed that their colors differ form each other.

Furthermore, when an attempt to move the cursor beyond the uppermost part or the lowermost part of the screen is made, the screen is scrolled. The scrolling of the screen is realized by rewriting the contents of the display memory 210.

When the cursor is moved to a program desired by the user, and the select button 215 is operated, processing corresponding to the program is performed (step 213). For example, processing for tuning to, if the program designated by the cursor is a program being currently broadcasted, the program and displaying the selected program on the screen, while processing for displaying, if the program designated by the cursor is a program to be broadcasted in the future, a screen for making a reservation, a purchase and the like.

When the selection carried out by the first letters is instructed in the step 211, a first letter selection screen is displayed (step 214). The first letter selection screen is a screen shown in FIG. 23, on which letters "A" to "Z" are displayed in alphabetical order. The cursor is movable on a frame in which each of the letters is displayed. The user operates the cursor buttons 211 to 214, to move the cursor to the first letter of the title of the program desired. The user presses the select button 215. Consequently, the first letter is selected, after which the program proceeds to the step 215. "C" shall be selected as the first letter.

In the step 215, an offset value corresponding to the first letter "C" is found from the index stored in the working memory of the on-screen image producing circuit 204. The contents of the display table are displayed on the screen from the offset value (step 216). Consequently, programs the titles of which begin with "C" are listed in the same format as the format shown in FIG. 22. In the list display screen, it is possible to perform predetermined processing by operating the cursor button and the select button, as in the step 213 (step 217). The input section 205 is provided with a cancel button, which is not illustrated. When the cancel button is operated in a case where the list display screen is displayed, the program is returned to the step 214. In the step 214, the first letter selection screen is displayed again.

Although in the above-mentioned third embodiment, display is merely started at the head of a group of programs the title of which has a letter designated on the first letter selection screen as the first letter out of groups of programs in the display table on which the titles of all the programs are so listed that their first letters are arranged in alphabetical order, only the group of programs the title of which has the first letter designated on the first letter selection screen may be displayed. In this case, the display range is so restricted that the programs other than the group of programs the title of which has the designated letter as the first letter are not displayed on the list display screen.

Figure 24:
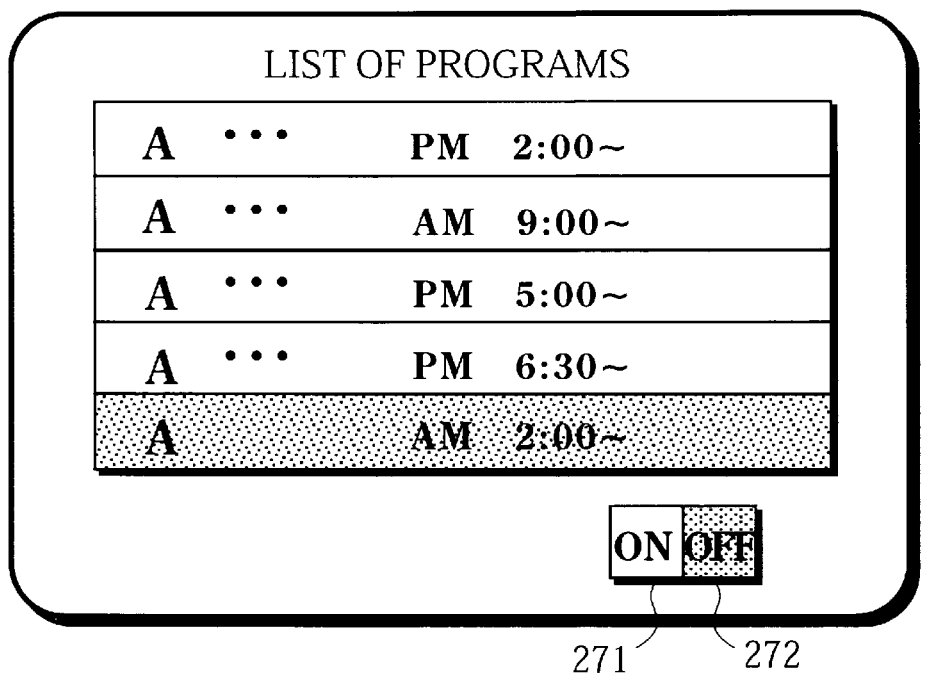
FIG. 24 is a typical view showing another example of a list display screen.

When the program thus displayed is restricted, it is preferable to provide means for releasing the restriction. For example, as shown in FIG. 24, it is considered that there are provided buttons 271 and 272 for switching a mode in which only a group of programs the title of which has the first letter designated on the first letter selection screen is displayed on the list display screen (a first mode) and a mode in which display is merely started at the head of a group of programs the title of which has a letter designated on the first letter selection screen as the first letter (a second mode).

In this case, the cursor is first moved onto the button 271 or 272 by operating the cursor button 214 or 212 representing rightward or leftward movement in a state where the cursor is positioned on any one of the programs. The display mode is designated by pressing the select button 215 upon moving the cursor onto the on-button 271 or the off-button 272 by similarly operating the right and left buttons 214 and 212 of the cursor. Specifically, when the off-button 272 is selected in the case of the first mode, the display mode is changed to the second mode. When the on-button 271 is selected in the case of the second mode, the display mode is changed to the first mode.

Figure 25:
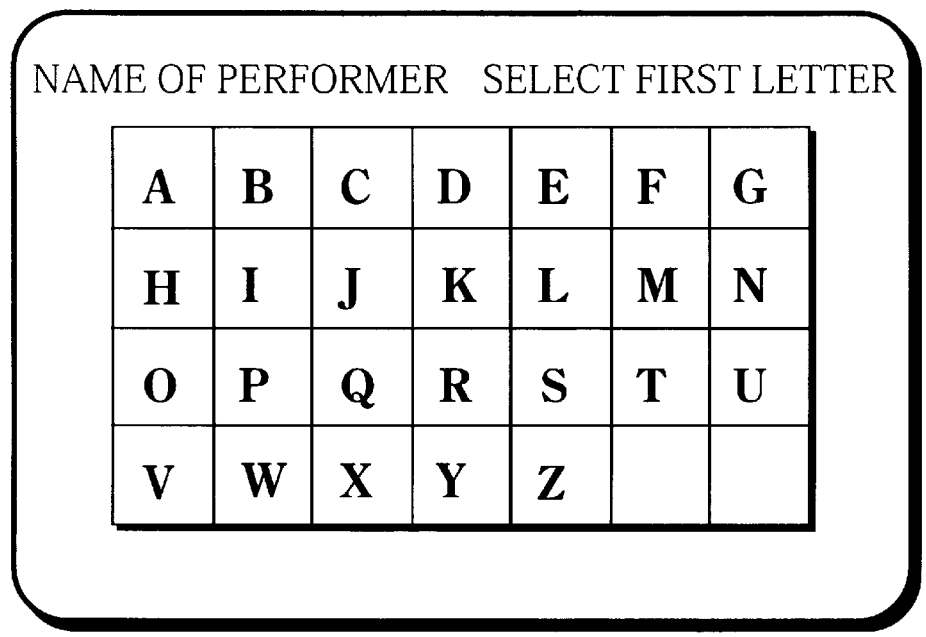
FIG. 25 is a typical view showing one example of a first letter selection screen for designating the first letters of the names of performers.

Not only display based on the titles of programs but also display based on the other information is possible. For example, by dividing programs for each performer, and previously producing a display table on which the programs are so listed that the performers are arranged in alphabetical order, to designate the first letter of the name of the performer as shown in FIG. 25, a list display screen including programs corresponding thereto may be displayed.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A program guide display controller at a user terminal of a television broadcasting system, comprising:

first entry means for enabling a user to enter a program guide display command for displaying a program guide screen on a display device;

second entry means for enabling the user to enter a menu screen display command for displaying a menu screen for making the user set contents for restricting the program guide displayed on the display device;

means for simultaneously displaying both the program guide screen and the menu screen when the program guide display command or the menu screen display command is entered as well as making active only one of the screens which corresponds to the entered command;

storage means for storing the set restricting contents on the menu screen; and program contents display control means for setting displayed contents on the program guide screen to contents adapted to the restricting contents stored in the storage means.

2. A program guide display controller at a user terminal of a television broadcasting system, comprising:

entry means for entering a first command for displaying a menu screen for performing various types of setting and a second command for displaying a program guide screen, and means for simultaneously displaying both the menu screen and the program guide screen when the first command or the second command is entered as well as making active only one of the screens which corresponds to the entered command.

3. A program guide display controller at a user terminal of a television broadcasting system, comprising:

entry means for entering a first command for displaying a menu screen for performing various types of setting and a second command for displaying a program guide screen;

first display control means for simultaneously displaying both the menu screen and the program guide screen when the first command or the second command is entered as well as making active only one of the screens which corresponds to the entered command; and second display control means for displaying the screen which is active and the screen which is not active out of the menu screen and the program guide screen so that the menu screen and the program guide screen can be visually identified.

4. The program guide display controller according to claim 3, wherein the second display control means displays the screen which is active by opacity and displays the screen which is not active by halftones.

5. The program guide display controller according to claim 4, wherein the second display control means comprises means for separately preparing color pallets used for the menu screen and color pallets used for the program guide screen, setting the transmittance of each of the color pallets for the menu screen to a value corresponding to the opacity as well as setting the transmittance of each of the color pallets for the program guide screen to a value corresponding to the halftones, and setting the transmittance of each of the color pallets for the program guide screen to a value corresponding to the opacity when the program guide screen is active as well as setting the transmittance of each of the color pallets for the menu screen to a value corresponding to the halftones.

\* \* \* \* \*